Patented Feb. 23, 1943

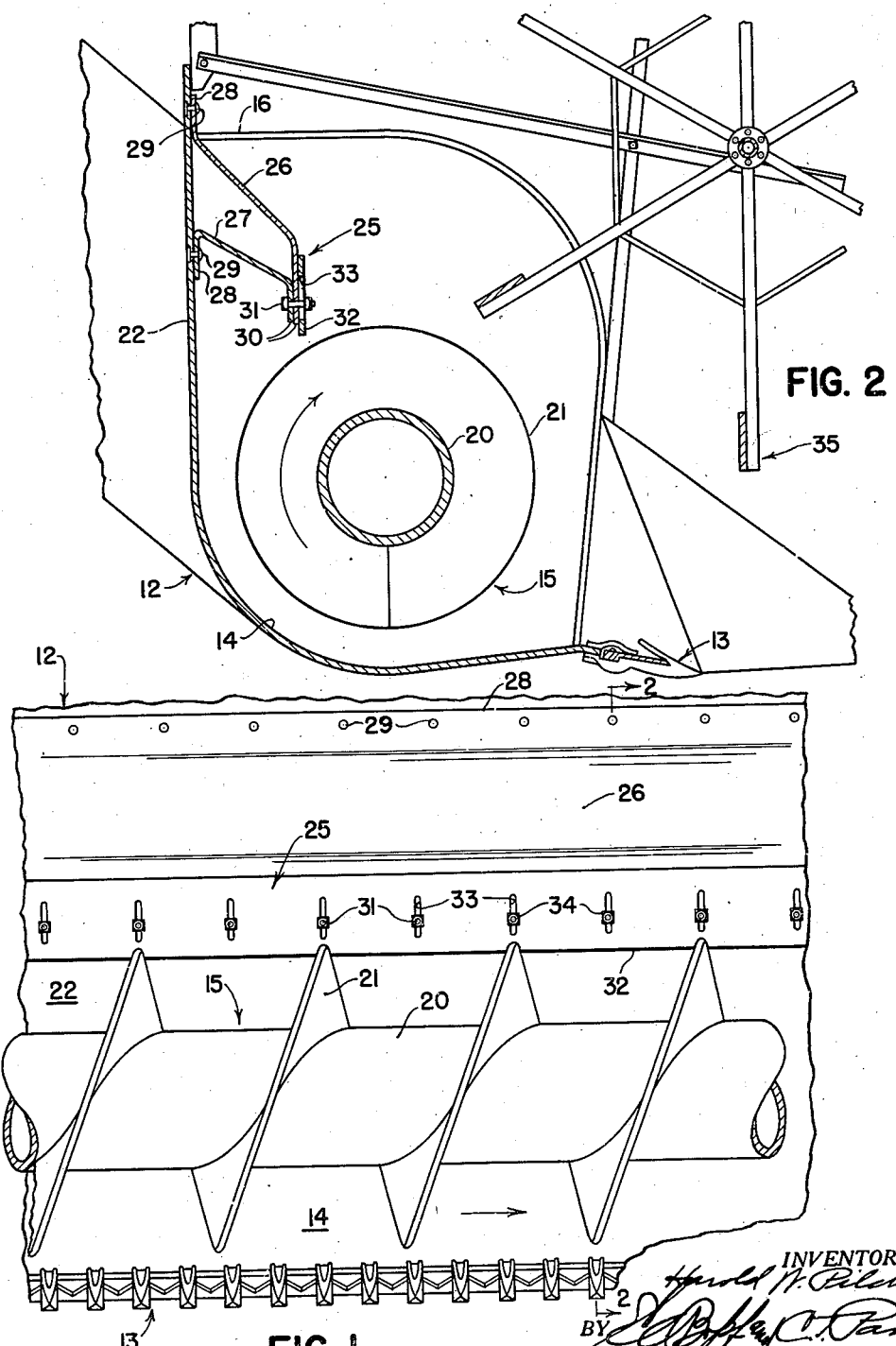
Feb. 23, 1943.     H. W. PILCHER     2,311,865
AUGER CONVEYER
Original Filed Aug. 17, 1940

2,311,865

UNITED STATES PATENT OFFICE 2,311,865

AUGER CONVEYER

Harold W. Pilcher, Rock Island, Ill., assignor to Deere & Company, Moline, Ill., a corporation of Illinois Original application August 17, 1940, Serial No. 353,078. Divided and this application October 17, 1940, Serial No. 361,525

6 Claims. (Cl. 198—213)

The present invention relates generally to auger conveyers and more particularly to auger conveyers for harvester platforms, and is a division of an application, Serial No. 353,078, filed August 17, 1940, by Pilcher and Oehler, and issued as Patent No. 2,270,471 on January 20, 1942.

The principal object of this invention relates to the provision of a novel and improved auger type conveyer, and more specifically it is an object of the invention to provide an improved auger type conveyer for the harvester platform which can be operated efficiently under widely varying crop conditions, to convey the crop with a minimum loss of grain and with a minimum of clogging or slugging.

It is customary to provide a baffle disposed horizontally along the back wall of the platform and extending forwardly over the upper portion of the auger conveyer for the purpose of assisting the conveyer in moving the harvested material along the platform trough and preventing the material from winding around the auger. It is desirable that the forward edge of the baffle extend to a position closely adjacent the top of the auger in order to act as a stripper in preventing harvested material from being thrown forwardly over the auger under normal conditions. I have found, however, that in certain crop conditions in which there is an abundance of heavy weeds mixed with the grain, it is desirable to increase the clearance between the stripper edge of the baffle and the auger in order to decrease the possibility of the heavy weeds becoming clogged between the auger and the stripper edge. It is, therefore, a still further specific object of this invention to provide means for adjusting the clearance between the stripper edge of the baffle and the edge of the blades of the auger.

These and other objects and advantages of the present invention will be apparent after a consideration of the following description in which reference is had to the drawing appended hereto, in which Figure 1 is a front elevational view of a portion of a harvester platform embodying the principles of this invention; and Figure 2 is a sectional elevational view taken along a line 2—2 in Figure 1 and showing in addition, the feeder house at the end of the platform and a portion of the harvester reel.

Referring now to the drawing, the harvester platform 12 includes a conventional cutter bar 13, behind which is disposed a transversely extending conveyer trough 14. An auger conveyer 15 is mounted in the platform trough 14 for rotation about an axis generally transverse with respect to the travel of the implement, and is supported by bearing means (not shown) at opposite ends of the auger. The auger 15 conveys the harvested material laterally from behind the cutter bar 13 to a feeder house 16, which extends rearwardly from the stubbleward end of the platform 12 and is rigid with respect thereto.

The auger 15 comprises a hollow shaft 20 of a substantial diameter to prevent wrapping of the stalks thereabout, and supported on the hollow shaft 20 is a helically wound auger blade 21, which is wound in such a direction that the harvested material is moved toward the feeder house 16 when the auger is turned in a clockwise direction, as viewed from the grainward side, as in Figure 2. The auger is disposed in the platform trough 14, which is preferably curved about the axis of rotation of the auger 15. The trough is continued upwardly at the rear of the auger to form a back wall 22, which extends along the entire length of the platform. As is customary in a platform having an auger conveyer, the horizontal baffle, indicated in its entirety by reference numeral 25, is mounted on the back wall 22 and extends along the length thereof and projects forwardly over the upper side of the auger 15. The baffle 25 comprises a pair of upper and lower sheet metal strips 26, 27, respectively, having rear flanges 28 serving to support the strips on the back wall 22 by means of rivets 29. The strips 26, 27 converge downwardly and forwardly from the back wall and have a pair of downwardly turned outer flanges 30, which fit closely together and are joined by means of a series of bolts 31. The lower edges of the flanges 30 terminate above the upper portion of the auger 15 and are vertically spaced from the edges of the helical blade 21 of the auger.

Although it is customary to provide such a baffle for the purpose of engaging any stalks that tend to pass over the top of the auger by virtue of the rotation of the latter and thus cause the stalks to be moved laterally along the back wall 22 toward the feeder house 16, I have discovered that the efficiency of the baffle can be greatly increased by providing a means for adjusting the clearance between the stripper edge along the forward edge of the baffle and the auger conveyer blades 21. Heretofore it has been customary to provide non-adjustable baffles with sufficient clearance over the auger to prevent heavy weed stalks from clogging the gap between the baffle and the auger blades, but when operating in other conditions where the crops are clean and with few weeds the auger does not operate at its maximum efficiency due to the clearance being more than necessary. Accordingly, I have provided an adjustable stripper edge in the form of an adjustable edge plate 32 which lies in juxtaposition with the downwardly turned flanges 30 of the baffle strips 26, 27 and extends along the entire length of the baffle 25. The plate 32 is provided with vertically extending slots 33 through which the bolts 31 are inserted. The slots 33 permit vertical adjustment of the plate 32 relative to the bolts 31 to increase or decrease the clearance between the lower edge of the stripper plate 32 and the blades 21 of the auger 15. The plate 32 is rigidly fixed to the baffle strips 26, 27 by tightening the nuts 34 on the bolts 31.

In operation the platform moves forwardly through the grain and as the cutter bar 13 severs the stalks, the latter are laid back against the auger 15 by means of a conventional reel 35. The rotating blade 21 of the auger engages the severed crop and moves it along the platform to the right, as viewed in Figure 1, with a tendency to crowd the stalks under the auger and up the back wall 22 and up under the baffle plate 27. The lower edge of the stripper plate 32 engages any of the crop that tends to be thrown forwardly over the top of the auger 15 and retains it in a pocket between the auger, the back wall 22, and the baffle strip 27. If it is observed that an appreciable quantity of grain is being thrown forwardly under the baffle plate 32, it is advisable to lower the latter by loosening the nut 34 and sliding the baffle strip 32 downward to a position slightly closer to the top of the auger 15, after which the bolts 34 are then retightened.

When operating in crops in which there is an abundance of heavy weeds and it is observed that the latter tend to clog the auger and become wedged between the auger blades and the stripper blades 32, it is then advisable to raise the latter slightly away from the edge of the auger blade 21 after loosening the bolts 31.

I claim:

1. In a harvester platform, a transversely disposed grain handling trough open along the front for receiving harvested grain and having a back wall, an auger conveyer rotatably supported in said trough, a generally horizontal baffle supported on said back wall and extending forwardly therefrom, a plate at the outer end of said baffle serving as the outer edge thereof and shiftable relative to the baffle toward and away from the auger conveyer, and means for adjustably fixing said plate relative to said baffle in any of several positions of adjustment.

2. In a harvester platform, a transversely disposed grain handling trough open along the front for receiving harvested grain and having a back wall, an auger conveyer rotatably supported in said trough, a generally horizontal baffle supported on said back wall and extending forwardly therefrom over said auger, a vertically disposed edge plate disposed at the outer edge of the baffle and shiftable vertically toward and away from the upper edge of the auger and means for fixing said edge plate to said baffle in adjusted position.

3. In a harvester platform, a transversely disposed grain handling trough open along the front for receiving harvested grain and having a back wall, an auger conveyer rotatably supported in said trough, a generally horizontal baffle supported on said back wall and extending forwardly therefrom, a reenforcing strip spaced vertically from said baffle and attached to said back wall, the outer edges of said baffle and reenforcing strip being secured together, an edge plate shiftable vertically relative to the outer edge of said baffle to adjust the clearance of said plate above said auger, and bolt means for securing said plate to said baffle in adjusted position.

4. In a harvester platform, a grain trough open along along the front for receiving harvested grain and having a back wall, an auger conveyer rotatably supported in said trough, means for rotating the auger in a direction in which the blades of said auger travel upwardly adjacent said back wall and downwardly at the front of said trough, and a baffle supported on said back wall and extending forwardly therefrom over said auger, said baffle comprising a pair of plates shiftable relative to each other to adjust the outer edge of said baffle toward or away from said auger, and means for securing said plates in adjusted position.

5. In a harvester platform, a grain trough open along the front for receiving harvested grain and having a back wall, an auger conveyer rotatably supported in said trough, means for rotating the auger in a direction in which the blades of said auger travel upwardly adjacent said back wall and downwardly at the front of said trough, and a baffle supported on said back wall and extending forwardly therefrom over said auger and having a generally vertical stripper edge portion disposed adjacent the upper edge of said auger in cooperative relation thereto, said baffle comprising a pair of plates shiftable relative to each other to adjust the clearance between said stripper edge and said auger, and means for securing said plates in adjusted position.

6. In a harvester platform, a grain trough open along the front for receiving harvested grain and having a back wall, an auger conveyer rotatably supported in said trough, means for rotating the auger in a direction in which the blades of said auger travel upwardly adjacent said back wall and downwardly at the front of said trough, and a baffle supported on said back wall and extending forwardly therefrom over said auger to form a grain receiving pocket between said auger, said back wall, and said baffle along which harvested grain is moved by said auger, said baffle having a generally vertical stripper edge portion disposed adjacent the upper edge of said auger in cooperative relation thereto, said baffle comprising a pair of plates shiftable relative to each other to adjust the clearance between said stripper edge and said auger without appreciably changing the volume of said pocket, and means for securing said plates in adjusted position.

HAROLD W. PILCHER.